June 30, 1964     O. BERGER     3,139,581
LONG SCALE MOVING COIL ELECTRICAL MEASURING INSTRUMENT
WITH ADDITIONAL FLUX AUGMENTING MAGNET
MEANS IN THE AIR GAP
Filed Nov. 21, 1961
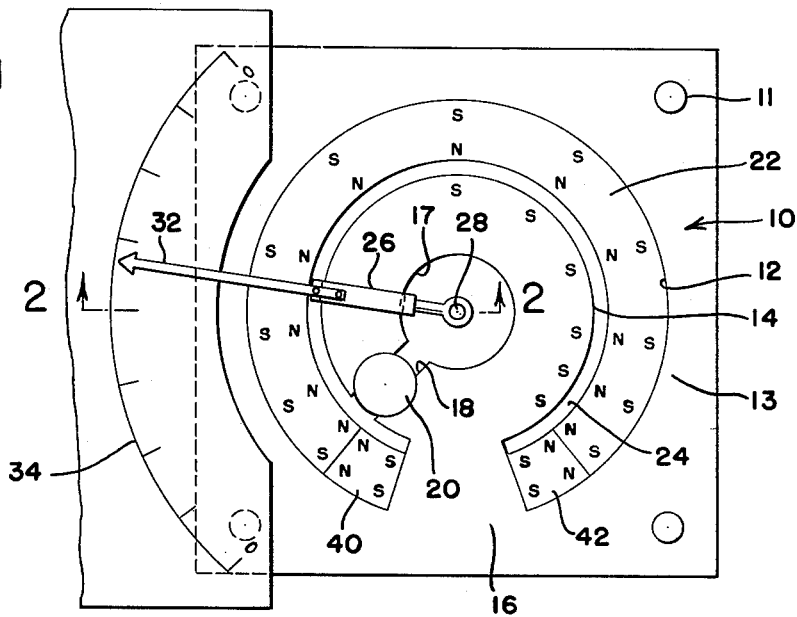
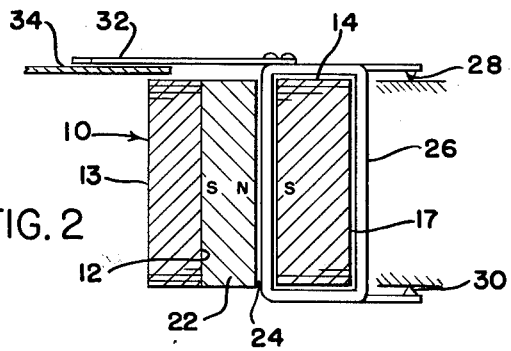
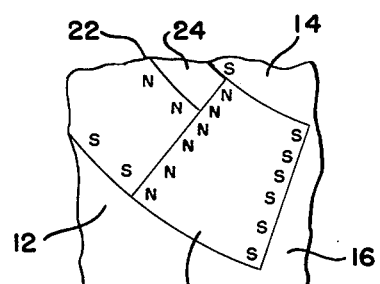
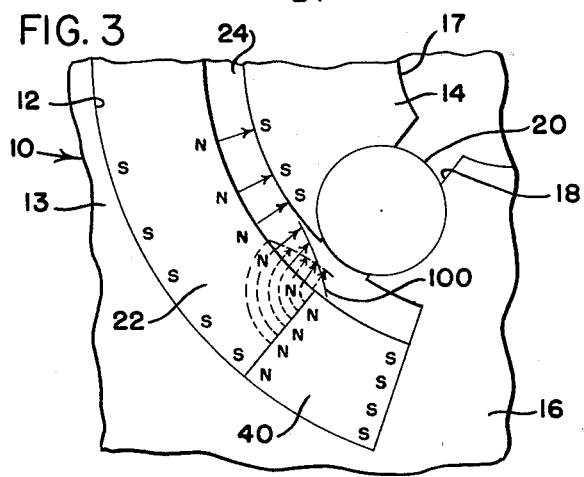
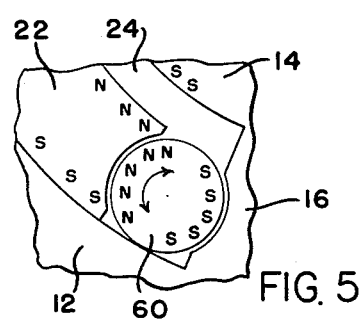
INVENTOR.
OTTO BERGER
BY Alfred C Body
ATTORNEY

United States Patent Office 3,139,581
Patented June 30, 1964

3,139,581
LONG SCALE MOVING COIL ELECTRICAL MEASURING INSTRUMENT WITH ADDITIONAL FLUX AUGMENTING MAGNET MEANS IN THE AIR GAP
Otto Berger, Bensberg, Bezirk Cologne, Germany
Filed Nov. 21, 1961, Ser. No. 154,001
6 Claims. (Cl. 324—150)

This invention pertains to the art of electrical measuring instruments and more particularly to a long scale measuring instrument of the moving coil type, using a C-shaped radially magnetized field magnet.

The present invention is particularly applicable to the art of long scale electrical measuring instruments and will be discussed with particular reference thereto; however, it is to be appreciated that the invention has much broader applications and may be utilized in a variety of permanent magnetic circuits.

The term "long scale electrical measuring instrument" as used herein refers to an electrical measuring instrument having an indicator actuator comprising a driven coil moving within an annular air gap defined by a C-shaped radially magnetized permanent magnet and an arcuate pole piece spaced from the magnet.

In a long scale electrical measuring instrument of the type using a moving coil, the overall angular length of the air gap between the C-shaped field magnet and the pole piece is limited by the size of the bridge-like core piece extending between the ends of the field magnet and connecting the inner and the outer pole pieces. This bridge-like core piece must have a sufficient cross-sectional dimension to allow flow of the magnetic lines of force between the inner and the outer pole pieces. To obtain the greatest possible angular movement of the coil, it is desirable to operate the coil throughout the entire length of the air gap. By operating the coil in the entire length of the air gap, it was found that the movement of the coil was non-linear as the coil approached the ends of the field magnet. If the linearity of the coil movement was to be maintained, the angular range of the coil movement had to be shortened which reduced the scale of the instrument.

The non-linearity of the coil movement resulted from the constantly diminishing flux density in the vicinity of the ends of the C-shaped field magnet, a phenomena which is explained by the fact that the lines of force crossing the air gap disperse at the ends of the magnet. If the length of the C-shaped field magnet were extended beyond the desired range of deflection of the moving coil, the ends of the magnet would be too closely adjacent the bridge-like core piece between the inner and outer pole pieces so that more magnetic lines of force would extend from the ends of the magnet to the core piece and the flux density in the air gap would be further decreased near the ends of the field magnet.

The present invention is directed to a long scale moving coil electric measuring instrument which provides a uniform flux density throughout a substantially larger angular range than was previously possible.

In accordance with the present invention, to obtain a uniform air gap flux density through an angle of at least 250 degrees, the free spaces between the ends of the C-shaped field magnet and the bridge-like core piece joining the inner and outer pole pieces are provided with low permeability augmenting permanent magnets so dimensioned and magnetized that the air gap flux density generated by the augmenting magnets at the ends of the field magnet amounts to about 10% of the flux density created by the field magnet and the flux density gradients of the augmenting magnets in a direction toward the middle of the field magnet are inversely equal to the flux density gradient of the field magnet.

In accordance with a more specific aspect of the present invention, a long scale electrical measuring instrument is provided comprising in combination: a C-shaped radially magnetized permanent field magnet having spaced ends, an outer arcuate pole piece about the field magnet, an inner arcuate pole piece joined to the outer pole piece by a bridge-like core piece extending between the ends of the field magnet and in spaced relationship thereto, an arcuate air gap between the magnet and one of the pole pieces, an augmenting low permeability permanent magnet between each end of the field magnet and the bridge-like core piece and so magnetized to provide a uniform flux density in the air gap adjacent the ends of the field magnet.

The primary object of the present invention is to provide a long scale electrical measuring instrument having a linear displacement throughout the complete operating range of the instrument.

A further object of the present invention is to provide a long scale electrical measuring instrument having linear displacement throughout the complete operating range of the instrument and which is easily produced and durable in operation.

Another object of the present invention is to provide a long scale electrical measuring instrument having linear displacement throughout an operating range of at least 250 angular degrees.

Still a further object of the present invention is to provide a long scale electrical measuring instrument having a moving coil operably recevied within an air gap and a flux augmenting permanent magnet having low permeability to produce a uniform flux density in the air gap over a wide range of deflection of the moving coil.

Still a further object of the present invention is to provide a long scale electrical measuring instrument having an arcuate air gap with a uniform flux density over at least 250 angular degrees.

These and other objects and advantages will become apparent from the following description taken to illustrate the preferred embodiments of the invention as read in connection with these accompanying drawings in which:

FIG. 1 is a top view illustrating a preferred embodiment of the present invention;

FIG. 2 is a cross sectional view taken along line 2—2 of FIG. 1;

FIG. 3 is an enlarged partial view disclosing schematically the magnetic flux patterns adjacent the ends of the field magnet;

FIG. 4 is an enlarged partial view similar to FIG. 3 and illustrating a second embodiment of the present invention; and FIG. 5 is an enlarged partial view similar to FIG. 3 and illustrating a third embodiment of the present invention.

Referring now to the drawings, wherein the showings are for the purpose of illustrating preferred embodiments of the invention and not for limiting same, FIG. 1 shows a magnetic system of the type used in a long scale electrical measuring instrument comprised generally of a body 10 of laminated magnetically permeable material secured together by appropriate rivets 11. Centrally disposed within the body 10 is an arcuate slot 12 extending axially through the body and defined by an outer magnetic pole piece 13 and an inner magnetic pole piece 14. To provide a unitary structure which may be easily manufactured and assembled, a bridge-like segment 16 extends between the ends of slot 12 and presents a magnetically permeable core piece which completes a magnetic circuit between the inner and outer pole pieces. Coaxially extending with respect to the slot 12 is an inner bore 17 which provides space for mounting a moving coil and indicator mechanism to be hereinafter described in detail. Radially extending from the bore 17 is a slot 18 closed at its outermost radial end by a plug 20. Positioned within the arcuate slot 12 is a C-shaped permanent field magnet 22 which when assembled within the slot defines a generally arcuate air gap 24 between the magnet and the inner pole piece 14.

The magnet 22 is of the radially magnetized type, the magnetic circuit thereof being completed across the air gap 24 through the inner pole piece 14, the bridge-like core 16 and the outer core piece 13. In the structural embodiment disclosed in FIG. 1, the magnet is radially magnetized to present north polarity magnetic poles along the arcuate surface of the magnet facing the air gap 24. This in turn causes the inner pole piece 14 to exhibit south polarity magnetic poles at its outer cylindrical surface as indicated in the drawing.

Referring now to FIG. 2, a moving coil 26 is formed into a generally rectangular loop surrounding the inner pole piece 14 and having one side extending axially through the air gap 24. To facilitate assembly of the moving coil about the inner core piece, the plug 20 is removable to allow insertion of the coil through slot 18 after which the plug is replaced to provide a generally smooth outer surface on the inner pole piece 14. The general construction of the plug 20 is not critical and various modification may be made to facilitate the desired assembly techniques. Basically, the coil 26 is affixed to appropriate support means schematically represented in FIG. 2 as centrally disposed bearings 28, 30. A pointer 32 is positioned on an appropriate portion of the coil so the coil shifts the pointer in accordance with the position of the coil within the air gap 24 which position is indicated by an appropriate means such as a scale 34.

The long scale electrical measuring instrument as so far described is substantially similar to prior measuring instruments in which it was found that the flux density in the air gap adjacent the opposite ends of the field magnet would decrease because of dispersion of the magnetic lines of force adjacent the ends of the magnet. This decrease in the flux density prevented linearity at the extreme ends of the measuring instrument. Thus the instrument could be used for only a shorter angle of deflection of the coil 26 or the markings on the scale 34 had to be altered, either of which was a disadvantage to the intended operation of the long scale measuring instrument. The present invention is a substantial improvement over prior instruments of this class and is directed to a means to obtain a uniform air gap flux density throughout an angle of deflection of at least 250 angular degrees.

The present invention contemplates the use of flux augmenting permanent magnets which are located between the ends of the field magnet and the core piece 16 and have one pole joined to the core piece 16 and the other pole spaced from the core piece 16 and facing field magnet 22.

Referring to FIG. 1, the flux augmenting magnets are disclosed as wedge-shaped permanent magnets 40, 42 which are magnetized along an axis generally perpendicular to the magnetization axis of the field magnet 22. Thus south poles of the augmenting magnets abut the core piece 16 and the north poles are positioned adjacent the ends of the field magnet 22. Since the north magnetic poles of the augmenting magnets are adjacent the north pole of the field magnet, the magnetic lines of flux from the augmenting magnet add to the lines of flux caused by the field magnet to increase the flux density adjacent the ends of the field magnet.

The operation of the field magnet and the augmenting magnet 40 is schematically disclosed in detail in FIG. 3.

In the preferred embodiment the augmenting magnet is so dimensioned and magnetized that the air gap flux density caused by the augmenting magnet 40 directly at the ends of the field magnet amounts to about 10% of the flux density caused by the field magnet. It has been found that this is the maximum decrease in the flux density over the working portion of the air gap. In FIG. 3 the solid arrows and line 100 indicate graphically the gradient of the flux density along the length of magnet 22. The flux density decreases along the solid gradient line because the flux lines of the north pole facing pole piece 14 adjacent the end of the magnet 22 tend to fan out and go around the end of the magnet to the south pole on the opposite side of the magnet instead of going across the air gap. The flux density created by the augmenting magnet 40 is indicated graphically by broken arrows and the broken gradient line which indicates that the gradient of this magnet is substantially inversely equal to the gradient of the field magnet so that by adding the flux densities created by the adjacent magnets, the flux density of the air gap remains substantially constant for a greater length of the air gap than is possible without the augmenting magnet.

An important aspect of the present invention is the material from which the augmenting magnets are constructed which material provides a high coercive permanent magnet with a low permeability; such a material is barium ferrite. By using an augmenting magnet of a material having low permeability not substantially greater than 1, such as barium ferrite, the flux augmenting magnet will increase the flux density of the air gap without deflecting the lines of force created by the field magnet.

The particular shape of the augmenting magnet may be varied without departing from the scope of the invention. The augmenting magnet may extend across only a portion of the space between the end of the magnet 22 and the core piece 16. Another change in the shape of the magnet is diclosed in FIG. 4 wherein a flux augmenting magnet 50 is wedge-shaped and extends entirely between the inner core piece 14 and the outer core piece 13. This modification provides a substantially constant air gap flux density to the edge of augmenting magnet 50.

A still further modification of the present invention is disclosed in FIG. 5 wherein a cylindrical flux augmenting magnet 60 is provided between the end of the permanent magnet 22 and the core piece 16. The cylindrical magnet 60 is magnetized to present diametrically opposite north and south magnetic poles, and the north poles are positioned adjacent the end of the field magnet and near the north pole of that magnet. By rotatably mounting the cylindrical magnet 60, the supplementary flux density created by this magnet can be adjusted with regard to both magnitude and direction.

Although particular pole arrangements have been disclosed in conjunction with a description of the preferred embodiments of the present invention, it is appreciated that certain changes may be made in the polarity of the magnets without departing substantially from the spirit and intended scope of the invention. Although the flux augmenting magnets have been disclosed as being positioned on either end of the field magnet, it is appreciated that in certain situations it may be desirable to have uniform flux density adjacent only one end of the field magnet; therefore, it is within the contemplation of the present invention to apply the flux augmenting magnets adjacent only one end of the field magnet.

Having thus described my invention, I claim:

1. In an electric measuring instrument comprised of a ring-shaped inner pole piece, a ring-shaped outer pole piece concentric with said inner pole piece and spaced radially therefrom to define an annular slot, a bridge portion connecting said inner and outer pole pieces into a unitary magnetic core, and a C-shaped permanent magnet in said slot and having its end spaced only slightly from said bridge portion, said magnet being radially magnetized to define a meter coil air gap and said slot, the improvement comprising: an augmenting magnet between at least one end of said C-shaped magnet and said bridge portion, said augmenting magnet substantially filling the space between the end of said C-shaped magnet and said bridge portion and being magnetized on an axis extending generally from said bridge portion to the end of said C-shaped magnet with the flux density gradient of said augmenting magnet in said air gap being inversely proportional to the flux density gradient of said C-shaped magnet in said air gap.

2. The improvement as defined in claim 1 wherein said augmenting magnet is formed from a low permeability material.

3. The improvement as defined in claim 1 wherein said augmenting magnet has a permeability not substantially greater than one.

4. The improvement as defined in claim 1 wherein said augmenting magnet is formed from barium ferrite.

5. The improvement as defined in claim 1 wherein said augmenting magnet is rotatably mounted adjacent said end of said C-shaped magnet to adjust the flux density of said second magnet in relation to the flux density of said C-shaped magnet.

6. The improvement is defined in claim 1 wherein said augmenting magnet has a flux density of substantially 10% of the flux density of said C-shaped magnet.

References Cited in the file of this patent

UNITED STATES PATENTS

| | | |
|---|---|---|
| 2,102,409 | Faus | Dec. 14, 1937 |
| 2,697,204 | Otzmann | Dec. 14, 1954 |
| 2,865,002 | Triplett | Dec. 16, 1958 |
| 2,959,736 | Lunas | Nov. 8, 1960 |

FOREIGN PATENTS

| | | |
|---|---|---|
| 452,440 | Great Britain | Aug. 21, 1936 |